July 11, 1967
H. J. MUMMA
3,330,589
ARTICLE HANDLING DEVICE
Filed March 14, 1966
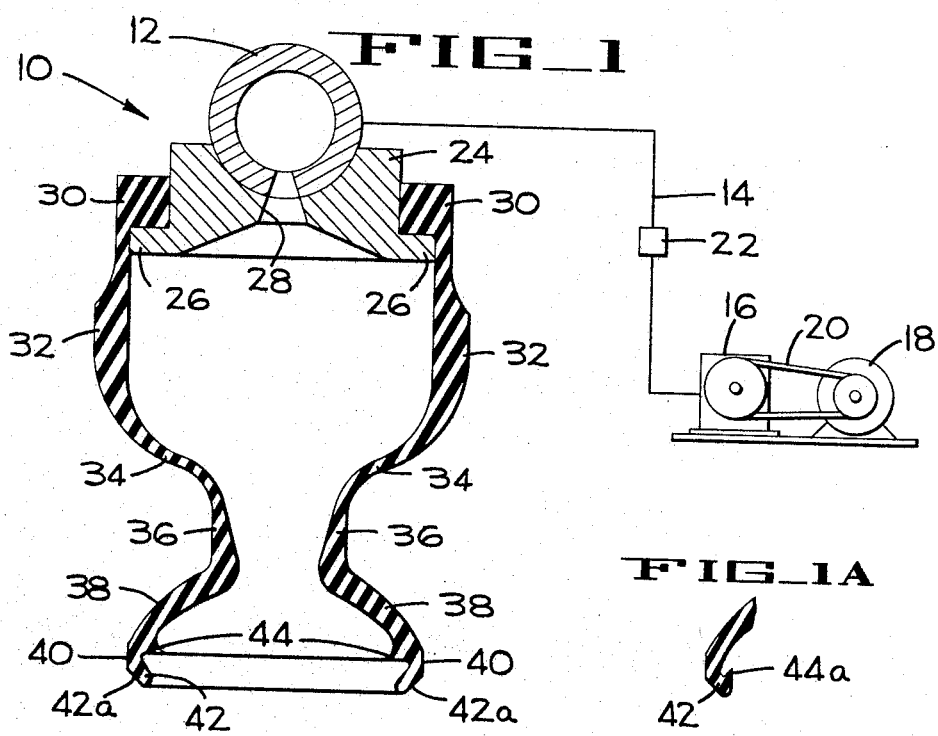
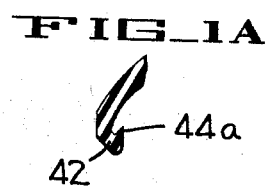
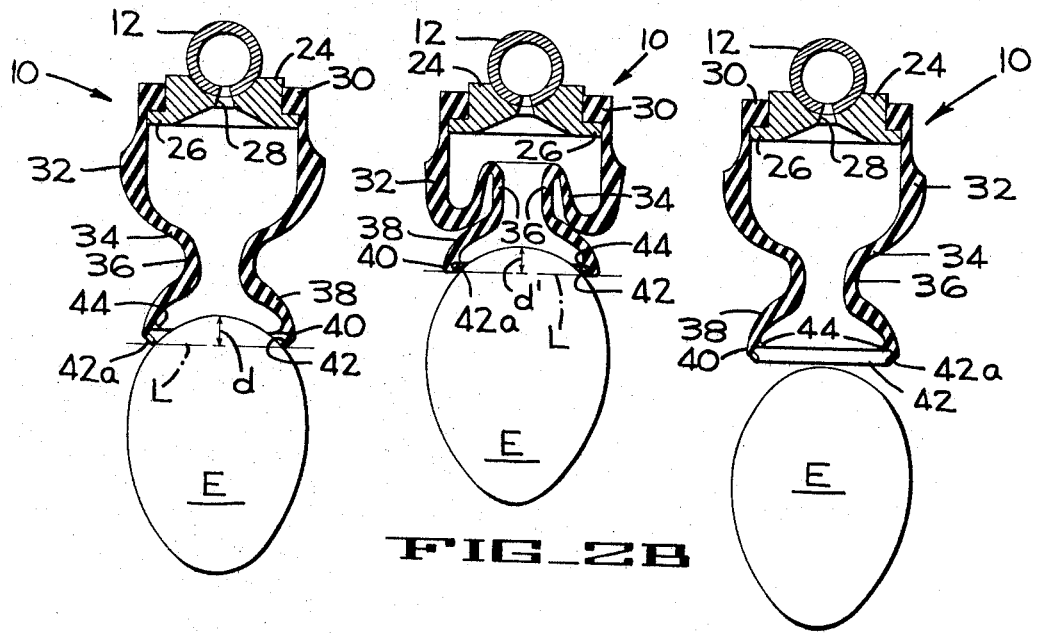
INVENTOR
HAROLD J. MUMMA
BY *Francis W. Anderson*
ATTORNEY United States Patent Office 3,330,589
Patented July 11, 1967

3,330,589
ARTICLE HANDLING DEVICE
Harold J. Mumma, Riverside, Calif., assignor to FMC Corporation, San Jose, Calif., a corporation of California
Filed Mar. 14, 1966, Ser. No. 533,932
6 Claims. (Cl. 294—64)

This invention relates to improvements in article handling devices and more particularly devices which are operated by vacuum.

Although this specification will describe the function and operation of the invention with regard to the handling of eggs, it is to be understood that it is equally effective to handle other items having a generally convex surface portion.

With the advent of automatic high speed egg grading and washing machines, bulk egg handling devices have been provided. These devices are designed to place an entire filler flat of eggs on the loading station of such machines. A typical example of an egg handling device of this type, is shown in U.S. Patent No. 2,798,757. In some instances the handling devices are machine manipulated to transport an entire flat of eggs to the loading station while in other instances the loading device is hand manipulated.

As shown in the referenced patent the handling device comprises a plurality of rubber-like longitudinally collapsable suction or vacuum cups which are arranged in grid fashion on a support structure. When the support structure is positioned above a flat of eggs it is pressed downwardly to engage the free end of each of the suction cups with the eggs whereupon a suitable control device is actuated to evacuate the interior of all the suction cups. Upon application of suction all of cups contract, lifting the eggs, whereupon they may be moved to the loading station of the egg grading machine.

The only known problem of handling eggs by the above method was the recurring tendency of the eggs to remain attached to the suction cups. This was particularly troublesome during the existence of humid atmospheric conditions which produced a film of water vapor on the surface of the egg. This film resulted in adhesive retention of the egg on the contacting portion of the suction cup. Such a condition was also observed in the absence of the water vapor film. It has also been determined that the detergent used for washing eggs leaves a film on the surface which will cause adhesion of the egg on the suction cup after the vacuum is released.

Efforts to correct these conditions by avoiding the occurrence of the film of water vapor and washing the eggs so that a film of detergent did not remain was reasonably successful but these procedures did not entirely eliminate the problem. Further study revealed that that portion of the suction cup which contacts the egg expanded as suction was applied resulting in a mechanical gripping of the egg. Such expansion was not relieved when the suction was released. This of course caused the egg to be retained by the suction cup.

According to this invention a suction cup is provided having a downwardly and inwardly extending egg engaging flange which upon contact with the surface of the egg deflects inwardly and upwardly and is held in that position during the time suction is applied to the cup. The flange actually decreases in diameter and it is effective, when the suction is released, to propel the egg out of engagement therewith. Thus the flange is not only effective to define a leak-proof band of contact with the egg but it assists in releasing the egg from the cup.

Accordingly it is an object of this invention to provide a new and improved article handling device.

Another object of this invention is to provide a vacuum operated article handling device which positively releases the article when the vacuum is interrupted.

Another object of this invention is to provide a suction cup whose release of articles such as eggs is not affected by the presence of films of water or detergent residue on the surface of the egg.

Other objects, advantages and features of the invention will be evident by referring to the following description and claims taken in conjunction with the accompanying drawing in which:

FIGURE 1 is an enlarged longitudinal section of the article handling device constructed in accordance with the invention and includes a diagrammatic representation of a suitable vacuum producing apparatus.

FIGURE 1A is an enlarged fragmentary of a modified form of the flange.

FIGURES 2A, 2B and 2C show, respectively, the article handling device as it engages an egg and just prior to the time that vacuum is applied, the shape assumed by the device when vacuum is applied, and release of the article.

Referring now to FIGURE 1 there is shown, and generally indicated by the numeral 10, a vacuum or suction cup embodying the invention. A manifold 12 is connected by means of a conduit 14 to a suitable vacuum pump 16 which is driven by a motor 18 whose output is connected to the vacuum pump 16 by a belt 20. In the conduit 14 there may be provided a suitable conventional control valve 22, which is manually or automatically operable, to regulate communication of the manifold 12 with the suction of the pump 16. Each suction cup is carried by a flange 26 on a fitting 24 which is secured to the manifold 12. A passageway 28 establishes communication between the interior of the suction cup 10 and the manifold 12.

The novel suction cup of this invention is made of any suitable resilient rubber-like deformable material. The cup is in the form of an irregular surface of revolution having an inwardly extending rib 30 seated on the upper surface of the flange 26. As shown in the drawings the suction cup has a generally hour-glass shape. From the rib 30 there is a downwardly extending enlarged diameter wall portion 32 merging into an inwardly and downwardly curved portion 34 which in turn continues to a neck portion 36. The lower end of the cup is formed with an outwardly and downwardly extending curved wall 38 terminating at 40. From this point there is a relatively thin downwardly and inwardly extending article engaging flange 42 which is designed to deflect inwardly when an article is engaged by the suction cup 10.

In order to limit the deflection of the flange 42 a thickened skirt 44 projecting inwardly from the inner surface of the cup is located upwardly adjacent this flange. Although limiting deflection of the flange 42 has been found to be helpful in handling certain articles, it was also discovered that its absence will not materially affect the basic mode of operation of the flange. Insofar as handling eggs the vacuum cup functions normally in the absence of the skirt 44.

In accordance with the basic feature of this invention the article engaging flange 42 not only establishes a narrow band of intimate contact with the surface of the article being handled but also reliably and positively releases the article when the vacuum is interrupted. FIGURES 2A, B and C show respectively an egg E engaged by the flange 42 and about to be picked up, the shape assumed by the suction cup when the egg is picked up, and release of the egg. The line L in FIGURES 2A and 2B represents a plane defining the intersection between the lowermost edge of the suction cup with the egg. The dimension represents the distance between the line L and the top of the egg and the distance $d'$ in FIGURE 2B between the same limits indicates the same dimension. When the vacuum cup is brought into engagement with an egg and vacuum is applied the cup collapses longitudinally carrying the egg upwardly therewith. During such collapse the flange 42 deflects inwardly rolling along the surface of the egg defining a band of contact between the surface portion 42a of the flange with the surface of the egg. If the vacuum cup is provided with the skirt 44 the flange 42 deflects until it comes into engagement with the skirt. In addition to deflection of the flange 42 inwardly the diameter of the band of contact with the surface of the egg is decreased causing the flange 42 to be drawn upwardly along the surface of the egg resulting in the dimension $d'$ which is less than the distance $d$ before vacuum is applied. Such upward and inward movement of the vacuum cup along the surface of the egg obviates the possibility of the egg being mechanically gripped by the flange.

In view of the action of the flange 42 when vacuum is applied it is to be appreciated that if the surface of the egg has a film of condensation or the residual film of the washing detergent, the scrubbing action of the flange as it reduces in diameter actually rubs such films from the surface portion of the egg and positively prevents retention of the egg due to the adhesive action of these films.

Another important feature of this invention is the action of the flange 42 when the vacuum on the cup is released. Let it be assumed that the vacuum on the cup shown in FIGURE 2B is released. When released, the pressure in the space enclosed by the cup and the egg assumes substantially atmospheric conditions allowing the cup to expand longitudinally as shown in FIGURE 2C. As the pressure in the cup rises, the energy stored by the deflected flange 42 is rendered effective to assume its nondeflected position and in doing so the egg is actually propelled or forced from the vacuum cup. This of course effects positive and rapid release of the egg. Accordingly, by providing a flange which deflects inwardly and upwardly while in engagement with the article to be handled results in a vacuum cup which is rapid and positive in releasing the egg.

As mentioned previously, the skirt 44 is not required to practice the principles of this invention. But if it is to be incorporated the skirt may either be located upwardly adjacent the flange 42 as shown in FIGURE 1 or it can be made integral with the flange 42 as indicated at 44a in FIGURE 1A. In either case the degree to which the flange 42 deflects inwardly is regulated.

Thus according to the above described invention it is readily apparent that a vacuum cup has been provided which includes a rotating flange establishing a narrow band of contact with the article being handled. Due to rotation of the flange release of the article is quickly and reliably performed. Also by providing a narrow band of contact, adhesion of the article to the cup in the presence of films of condensed water vapor or detergent is prevented.

Although the necessary elements and their correlation have been described in detail above it is to be understood that the inventive concept is susceptible to other variations which are intended to come within the confines of this invention. It is requested that the scope of this invention be limited only by relevant prior art and a proper interpretation of the appended claims.

What I claim is:

1. An article handling device comprising an elongate hollow body made of deformable material, one end of said body being adapted to be connected to a vacuum producing device, the other end of said body terminating in a narrow deflectable article engaging flange which defines a narrow continuous band of contact when engaged with the surface of such article, said body being effective when under the influence of vacuum to collapse longitudinally and accordingly lift the article engaged thereby while at the time causing said flange to deflect inwardly as the article is lifted.

2. The invention of claim 1 wherein release of such vacuum permits said body to elongate to its original length and allows said flange to deflect outwardly releasing the engaged article.

3. The invention according to claim 2 further comprising a skirt portion on said body for limiting the inward deflection of said flange.

4. The invention according to claim 3 wherein said skirt is located upwardly adjacent said flange.

5. The invention according to claim 3 wherein said skirt is integral with said flange.

6. The invention according to claim 1 wherein said flange projects downwardly and inwardly relative to the longitudinal axis of said body.

References Cited

UNITED STATES PATENTS

| | | | |
|---|---|---|---|
| 2,658,789 | 11/1953 | Tellier | 294—64 |
| 2,750,222 | 6/1956 | Borah | 294—64 X |

GERALD M. FORLENZA, *Primary Examiner.*

F. E. WERNER, *Assistant Examiner.*